United States Patent
Hall (10) Patent No.: US 7,916,677 B2
(45) Date of Patent: *Mar. 29, 2011

(54) POWER CONTROL TECHNIQUES FOR WIRELESS DEVICES

(75) Inventor: Steven D. Hall, Olivenhain, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/603,157

(22) Filed: Oct. 21, 2009

(65) Prior Publication Data

US 2010/0039975 A1 Feb. 18, 2010

Related U.S. Application Data

(63) Continuation of application No. 11/527,982, filed on Sep. 27, 2006, now Pat. No. 7,630,331.

(51) Int. Cl.
*G08C 17/00* (2006.01)

(52) U.S. Cl. ........................................ 370/311

(58) Field of Classification Search .................. None
See application file for complete search history.

(56) References Cited

U.S. PATENT DOCUMENTS

| 6,856,789 | B2 | 2/2005 | Pattabiraman |
| 2002/0075974 | A1* | 6/2002 | Mill ............................... 375/340 |
| 2004/0002312 | A1* | 1/2004 | Li et al. ....................... 455/232.1 |
| 2005/0229226 | A1 | 10/2005 | Relan |
| 2005/0254475 | A1* | 11/2005 | Kubler et al. .................. 370/338 |
| 2006/0087996 | A1 | 4/2006 | Stephens |
| 2007/0008915 | A1 | 1/2007 | Kim et al. |
| 2008/0046547 | A1 | 2/2008 | Olsen et al. |
| 2008/0076364 | A1 | 3/2008 | Hall |
| 2009/0080350 | A1 | 3/2009 | Bennett et al. |
| 2009/0092069 | A1 | 4/2009 | Rhee |
| 2010/0128817 | A1* | 5/2010 | Philips et al. .................. 375/316 |

OTHER PUBLICATIONS

Notice of Allowance dated Jul. 10, 2009, U.S. Appl. No. 11/527,982.

* cited by examiner

*Primary Examiner* — Ajit Patel (74) *Attorney, Agent, or Firm* — Brake Hughes Bellermann, LLP (57) ABSTRACT

Various embodiments are disclosed relating to wireless systems, and also relating to power control techniques for wireless devices. One disclosed embodiment comprises a wireless receiver that includes a processing circuit. In one example embodiment, at least a portion of the processing circuit may process only a portion of an ID packet. The portion of the ID packet that is received and processed may be less than a full ID packet, which may provide power savings.

20 Claims, 5 Drawing Sheets

POWER CONTROL TECHNIQUES FOR WIRELESS DEVICES

CROSS-REFERENCE TO RELATED APPLICATION

This application is a continuation application of U.S. patent application Ser. No. 11/527,982, filed on Sep. 27, 2006, now issued as U.S. Pat. No. 7,630,331, the disclosure of which is hereby incorporated by reference.

BACKGROUND

Wireless interface devices have become popular because they allow users to control and provide input to the host computer, while freeing users from the entanglement and limitations of traditional wired interface devices. However, a disadvantage of wireless devices is a limited battery lifetime. To conserve battery power, various circuits in the wireless interface device may remain in a sleep or low power state during certain periods. The wireless interface device may consume significant battery power after transitioning from a low power state to an operational or high power state to perform some functions, such as scanning for and receiving packets (such as identification packets). For example, a wireless device may scan for ID packets, e.g., to determine if there is a device that either wants to pair with it or to send it information. Therefore, there may be a need for techniques to reduce the consumption of power in wireless devices.

SUMMARY

The details of one or more implementations are set forth in the accompanying drawings and the description below. Other features will be apparent from the description and drawings, and from the claims.

DETAILED DESCRIPTION

Figure 1:
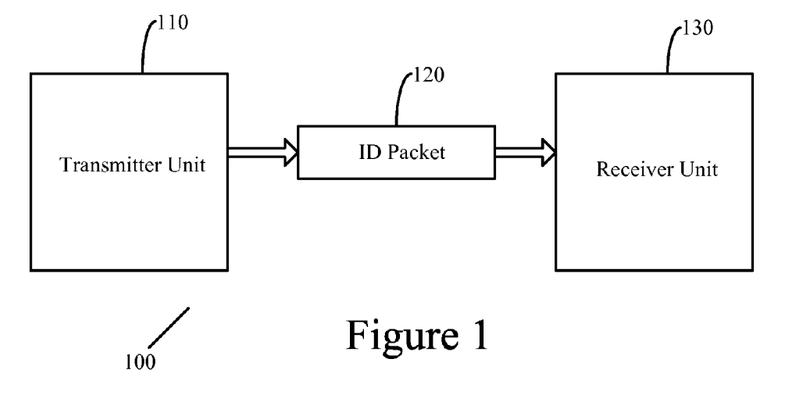
FIG. 1 is a block diagram of a wireless system according to an example embodiment.

FIG. 1 is a block diagram of a wireless system according to an example embodiment. As shown in FIG. 1, a wireless system 100 may include a wireless transmitter unit 110 (or wireless transmitting device) in wireless communication with a wireless receiver unit 130 via wireless communication link. For example, transmitter unit 110 and receiver unit 130 may each be a PC, laptop computer, cell phone, PDA (personal digital assistant), wireless headset, or any other wireless device. In an example embodiment, transmitter unit 110 may be a Bluetooth compatible cell phone, and receiver unit 130 may be a Bluetooth compatible wireless headset, although this is merely an example, and any devices and protocols may be used. For example, transmitter unit 110 (e.g., cell phone) may be transmitting wireless audio or speech signals via a Bluetooth wireless link to receiver unit 130 (e.g., wireless headset). Although not shown, both transmitter unit 110 and receiver unit 130 may include wireless transceivers (transmitter/receivers) to both send and receiver wireless signals.

As shown in FIG. 1, transmitter unit 110 may send (or transmit) an identification packet 120 ("ID packet") to a receiver unit 130. For example, transmitter unit 110 may send either a page directed to a particular receiver unit 130, or an inquiry directed to any receiver unit 130. As an example, Bluetooth-type transmitter units 110 in paging mode may send a Bluetooth-type ID packet 120.

Bluetooth-type receiver unit 130 (and other wireless devices) may enter a page scan mode to determine whether there is an incoming message by scanning for an ID packet 120, or other frame or message, from a transmitter unit 110, which may be either a paging device or an inquiring device. A paging device may send an ID packet 120 with a particular receiver unit's 130 address, whereas an inquiry device sends an ID packet 120 which may be recognized by any Bluetooth-type receiver unit 130 within range.

A Bluetooth device or receiver unit may typically operate in one of three different page scanning modes, denoted $R_0$, $R_1$, and $R_2$. In $R_0$ mode, the receiver unit 130 is always "on," or listening for an ID packet 120. In the $R_0$ mode, the listening components of the receiver unit 130 are always on and consuming power. In $R_1$, the receiver unit 130 "wakes up," or listens, every 1.28 seconds (or in some cases no less than every 1.28 seconds), whereas in $R_2$, the receiver unit 130 wakes up or listens every 2.56 seconds (or for example, no less than every 2.56 seconds). In both $R_1$ and $R_2$ modes, the receiver unit 130 may typically listen for 11.25 milliseconds before returning to "sleep" mode. Thus, the listening components of the receiver unit 130 are consuming power for 11.25 milliseconds of each cycle, the cycle lasting either 1.28 seconds for $R_1$ mode or 2.56 seconds for $R_2$ mode. If the receiver unit 130 receives an ID packet 120 that the receiver unit 130 recognizes as a valid page, then the receiver unit 130 replies to the transmitter unit 110 with the receiver unit's 130 own address, informing the transmitter unit 110 of the receiver unit's 130 presence.

Figure 2:
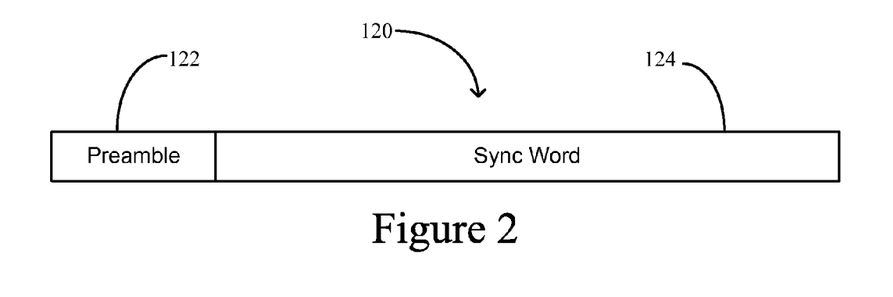
FIG. 2 is a block diagram of an identification packet according to an example embodiment.

FIG. 2 is a block diagram of an identification packet according to an example embodiment. Identification (ID) packet 120 may include a preamble 122, and a sync (or synchronization) word 124. The preamble 122 may include four bits of information, such as, for example, a fixed zero-one pattern of four symbols, and may be transmitted over a time period of four microseconds, although other time periods may be used. In an example embodiment, the zero-one pattern may be a 1010 if the first bit of the sync word 124 is 1, or 0101 if the first bit of the sync word 124 is 0, for example. The sync word 124 may include, for example, sixty-four bits of information derived from a twenty-four bit address, transmitted over a time period of sixty-four microseconds. The construction of the sync word 124, in some cases, may be designed to create a large Hamming distance between sync words 124 based on different addresses. In an example embodiment where ID packet 120 may include a Bluetooth identification packet, the ID packet 120 may be sixty-eight bits of information transmitted over a time period of sixty-eight microseconds, with one bit transmitted each microsecond, for example. When in inquiry or page mode, the transmitter unit 110 may frequency hop through the 2.4 GHz frequency band by repeatedly sending two ID packets 120 and listening for two ID packet responses at different frequencies 3,200 times per second, creating a residence time of 312.5 microseconds per frequency, for 5.12 seconds, minimizing the possibility that the identification packet 120 will not be received and recognized by the receiver unit 130, according to an example embodiment.

Figure 3:
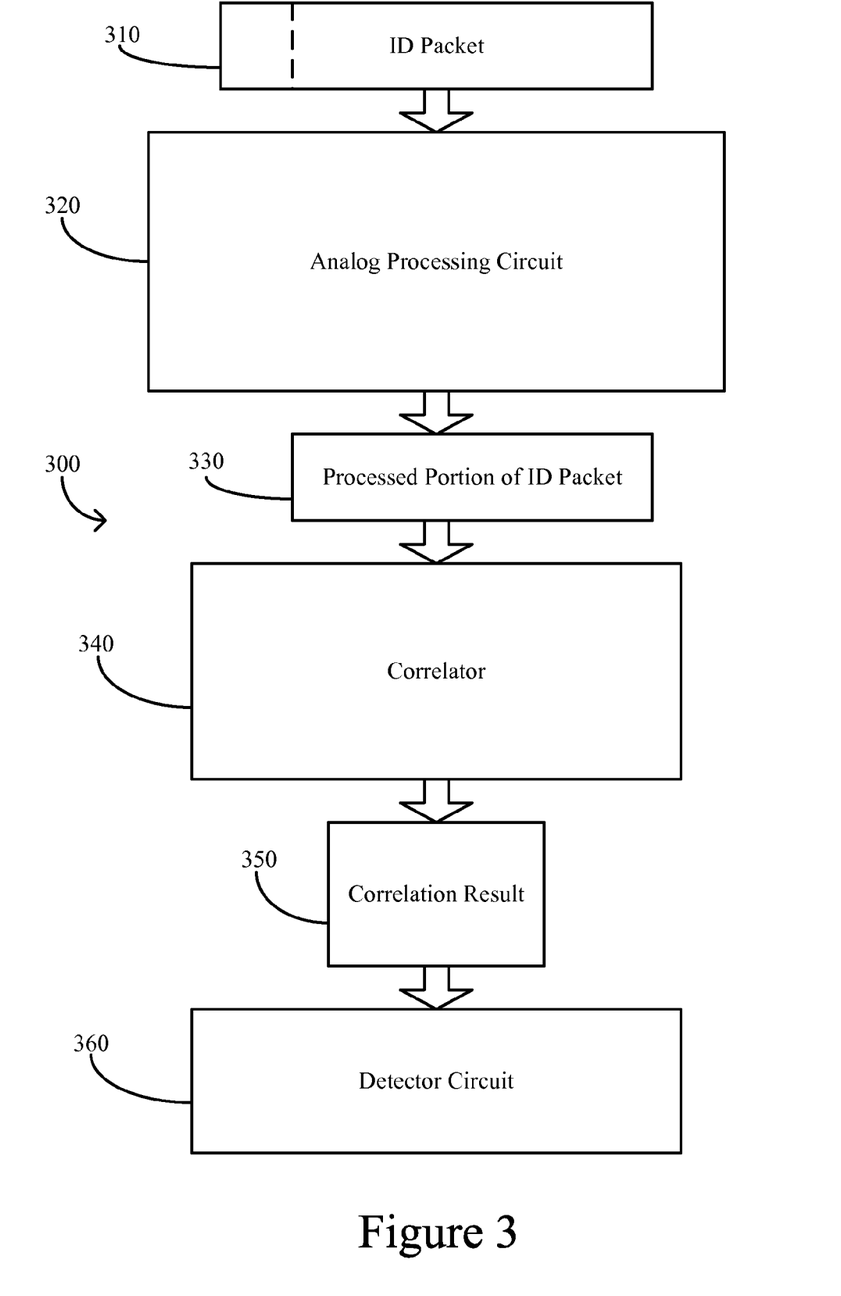
FIG. 3 is a block diagram illustrating operation of a wireless receiver according to an example embodiment.

FIG. 3 shows a block diagram of a wireless receiver unit 300 according to an example embodiment. According to an example embodiment, receiver unit 300 may include a number of circuits, such as an analog processing circuit 320, a correlator 340 and a detector circuit 360, for example, among other circuits.

After waking from a low power state to an operational state, analog processing circuit 320 may receive and process a portion of an ID packet (e.g., less than a full ID packet), according to an example embodiment. In an example embodiment, the analog processing circuit 320 may be configured to wake from a low power state to an operational state periodically, remaining in the operational state for a time period less than a receipt time for a full ID packet 310, which, in the case of a Bluetooth-type ID packet, may mean that analog processing circuit 320 may remain in the operational state for less than sixty-eight microseconds. The analog processing circuit 320 may be further configured to perform analog processing functions on the portion of the ID packet 310, and to output a processed portion 330 of the ID packet to the correlator 340. According to an example embodiment, by remaining in an operational state for a relatively short period of time, e.g., for a period of less than a full ID packet, power consumption of the receiver unit 300 may be decreased.

The correlator 340 may also periodically be placed in a sleep or low power state, or alternatively, may always remain in an operational state. Correlator 340 may receive and correlate the processed portion 330 of the ID packet with an ID or address of the receiver unit 300, for example, and may output a correlation result 350.

Detector circuit 360 may also periodically be placed in a sleep or low power state, or alternatively, may always remain in an operational state. Detector circuit 360 may compare the correlation result 350 to a correlation threshold to determine whether the ID packet 310 was the product of a page or inquiry, or directed to receiver unit 300. Alternatively, the correlator 340 and the detector circuit 360 may remain on during an entire scanning period, e.g., during the entire 11.25 ms scanning period.

According to an example embodiment, because only a portion of the ID packet may be received and processed by analog processing circuit 320 during an operational state of the analog processing circuit 320, a lower correlation threshold may be used (e.g., as compared to a correlation threshold that may ordinarily be used for the correlation of a complete ID packet). By having a portion of receiver unit (e.g., analog processing circuit 320) remain in a low power state for a longer period of time and then receiving and processing only a portion of the ID packet 310, this may allow the receiver unit 300 to conserve power by waking the analog processing circuit 320 for shorter portions of time and still recognize a page. In addition, by using only a portion of an ID packet for correlation, this may, in some case, increase the likelihood of falsely recognizing a page or false hit (e.g., where a correlation result that may exceed the correlation threshold may be based on noise rather than a valid page).

According to an example embodiment, as noted above, receiving, processing and correlating only a portion of an ID packet may increase the likelihood of a false hit (e.g., a correlation result that may exceed the correlation threshold is based on noise or other erroneous signals, and not based on a valid page). Therefore, to decrease the occurrences of false hits or false correlation results, some additional processing may be performed to confirm the validity of the page or correlation result.

In one example embodiment, if a correlation result 350 from a processed portion 330 of an ID packet exceeds a threshold, the receiver unit 300 may then receive and process a new full ID packet 310, and the detector circuit 360 may then compare the new correlation result 350 to a higher correlation threshold, to reflect the receipt of the full ID packet 310 rather than a partial ID packet 310. If the new correlation result for the full ID packet exceeds the high correlation threshold (for the full ID packet), then this may confirm the validity of the page or inquiry from the transmitter unit 110. In another example embodiment, if the correlation result 350 for the partial ID packet exceeds the correlation threshold (e.g., indicating that the correlation was the product of a page or inquiry), the receiver unit 300 may respond by transmitting a reply message or packet including its address back to the pager unit to inform the pager unit of the receiver unit's 300 presence. A receiver unit may alternatively perform both of these operations, e.g., correlating a second (full) ID packet and then sending a reply to the transmitter unit 110. Additional (or alternative) operations or processing may also be performed by receiver unit 300 to confirm the validity of the page or correlation result, as described in greater detail with respect to FIG. 5.

Figure 4:
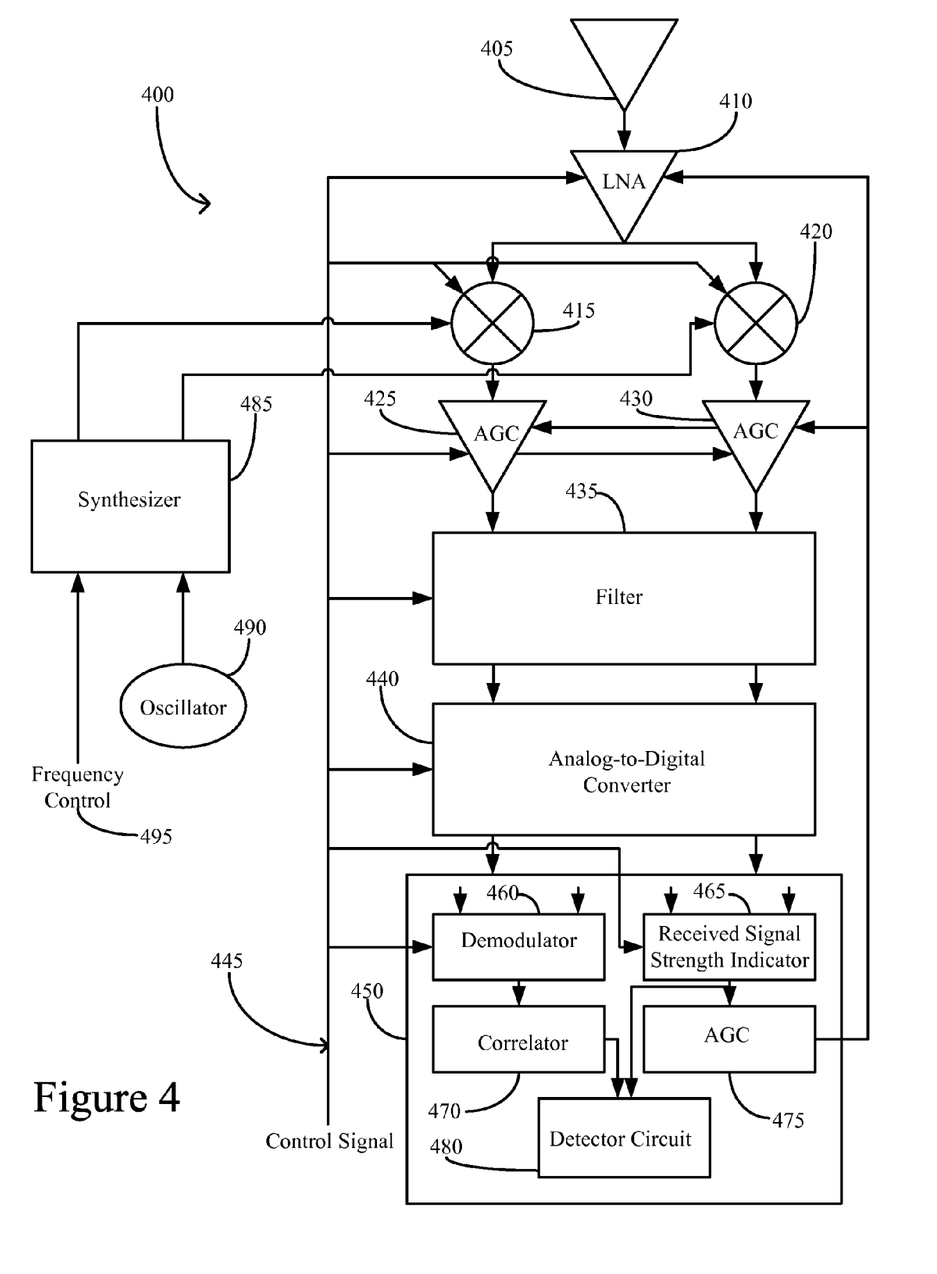
FIG. 4 is a circuit diagram of a wireless receiver according to an example embodiment.

FIG. 4 is a circuit diagram of a wireless receiver according to an example embodiment. Wireless receiver 400 may be an example of a receiver unit 130, 300, for example. Referring to FIG. 4, a wireless receiver 400 may include an antenna 405; and an analog processing circuit. The analog processing circuit, for example, may include a low noise amplifier 410, a first mixer 415 and a second mixer 420, a first automatic gain control 425 and a second automatic gain control 430, a filter 435, an analog-to-digital converter 440, and/or other circuits. These are merely examples of the kinds of circuits or blocks that may be provided within an analog processing circuit 320, and which a portion of such analog processing circuit 320 may be placed into a low power state for periods of time (e.g., such as during receipt of a portion of an ID packet), e.g., to conserve power and improve battery life.

The wireless receiver 400 may also include a number of additional circuits, which may or may not enter low power state during receipt of a portion of an ID packet. For example, receiver 400 may include a synthesizer 485 that may receive a frequency control signal 495. Also, an oscillator 490 may output a signal to synthesizer 485. Frequency synthesizer may generate signals at one or more selected frequencies, and output these signals to various circuits. A signal processing circuit 450 may include a demodulator 460 to demodulate received signals, a received signal strength indicator 465 which may indicate received signal strength of received signals (e.g., from analog processing circuits or other circuits), a correlator 470 to correlate a received signal, an automatic gain control 475, and a detector circuit 480. Detector circuit 480 may compare the amplitude of a correlation output from correlator 470 to a threshold, for example. The signal processing circuit 450 may also be referred to as a digital processing circuit, for example.

In an example embodiment, one or more of these additional circuits may enter a lower power state along with at least a portion of the analog processing circuit during a portion of receipt of the ID packet, while in another example embodiment, some of these additional circuits (e.g., synthesizer 485, oscillator 490, demodulator 460, correlator 470, detector circuit 480, RSS indicator 465, etc.) may remain in a high power or operational state throughout receipt of a full ID packet.

According to an example embodiment, the analog processing circuit may receive a portion of an ID packet via the antenna 405. In an example embodiment, at least a portion of the analog processing circuit may be configured to wake from a low power state to an operational state to perform analog processing functions on the portion of the ID packet, as discussed with reference to FIG. 3, and send the processed portion of the ID packet to the demodulator 460. The demodulator 460, may demodulate the analog processed portion of the ID packet to generate a demodulated portion of the ID packet. Alternatively, the wireless receiver 400 may not utilize a demodulator 460, and the analog processing circuit may send the processed portion of the ID packet directly to the correlator 470. Correlator 470 may correlate the demodulated portion of the ID packet against an address or other information.

The oscillator 490 and frequency control 495 may be configured to control the frequency of the synthesizer 485. The synthesizer 485, in turn, may be configured to serve as an oscillator for the first mixer 415 and the second mixer 420.

A control signal 445 may be provided to turn on and off one or more circuits that may be placed into a low power state during receipt of at least a portion of the ID packet. For example, control signal 445 may turn on and off one or more circuits associated with the analog processing circuit, such as low noise amplifier 410, mixers 415 and 420, automatic gain control 425 and 430, the filter 435, the analog-to-digital converter 440, etc. The control signal 445 may also be input to other circuits, such as demodulator 460. The control signal 445 may turn on and off the circuits for different durations. For example, control signal 445 may turn off the circuits associated with the analog processing circuit, such as the filter 435 and automatic gain control 425 and 430 for a shorter time than the other circuits in the analog processing circuit or the signal processing circuit 450.

In an example embodiment, demodulator 460 may output zeros to correlator 470 when analog processing circuits are placed into a low power state, based on control signal 445. The output of zeros by demodulator 460 during an inactive or low power state of analog processing circuit may avoid any noise or spurious signals from being received and demodulated and then demodulator 460 outputting some random signals (based on these spurious signals from demodulator 460) to correlator 470. Thus, by having demodulator 460 output zeros or other known signals while at least a portion of the analog processing circuit is in a low power state, this may avoid erroneous correlations at correlator 470, for example.

The correlator 470 may correlate either the processed portion of the ID packet or the demodulated portion of the ID packet with an ID or an address of the wireless receiver 400, for example, to generate a correlation result, and send the correlation result to the detector circuit 480. The detector circuit 480 may then compare the correlation result to a correlation threshold. The detector circuit 480 may determine that there is a match if the correlation result equals or exceeds the correlation threshold.

The above-described configurations and processes enable the wireless receiver 400 to determine a match based on receipt of less than a full ID packet, which may, for example, allow a device or receiver to consume less power by keeping at least a portion of the receiver, such as at least a portion of the analog processing circuitry 320 and/or signal processing circuit 450, off for a fraction (or portion) of each period that is less than a receipt time for a full ID packet. For example, a portion of the analog processing circuitry and/or signal processing circuit 450 may be turned off less than sixty-eight microseconds every sixty-eight microsecond period of the 11.25 msec listening time of each 1.28 second or 2.56 second period in the example of a Bluetooth-type wireless receiver 400. This is merely one example. However, it is possible that the above-described configurations and processes could determine that a match exists when random noise or other signals caused the wireless receiver 400 to receive a sequence of signals matching a pattern in the correlator 470 (e.g., a false hit at the correlator 470). The received signal strength indicator 465 may be configured to assist the detector circuit 480 in excluding noise as a possible cause of the match.

In addition to sending the processed portion of the ID packet to the demodulator 460 or correlator 470, the analog processing circuit may also send the processed portion of the ID packet to the received signal strength indicator 465. The received signal strength indicator 465 may send a signal strength indication to a third automatic gain control 475 (which may communicate with the low noise amplifier 410 to maintain a desired amplitude) and to the detector circuit 480.

Figure 5:
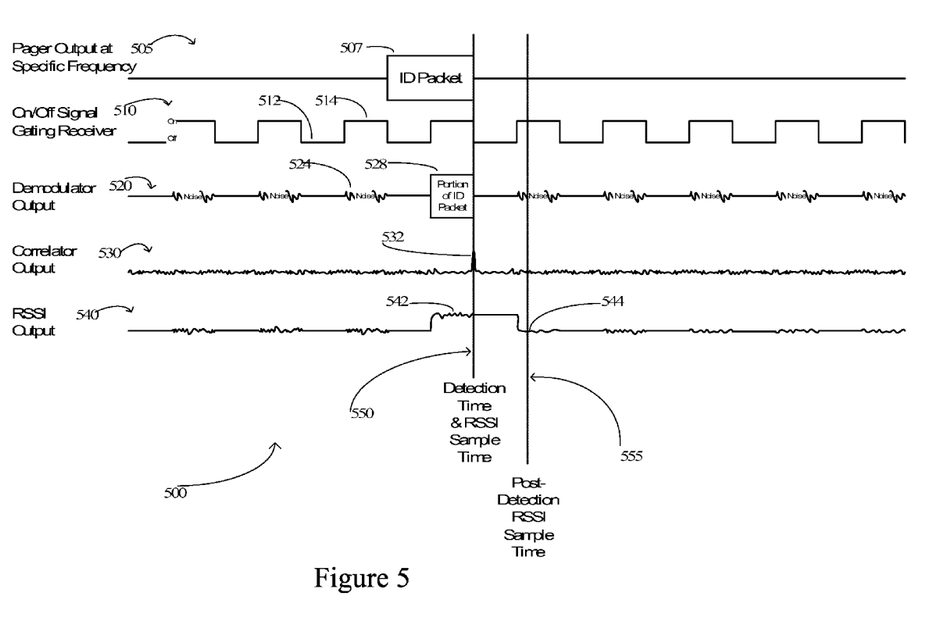
FIG. 5 is a timing diagram illustrating operation of a wireless receiver according to an example embodiment.

The detector circuit 480 may compare the correlation result to the signal strength indication as functions of time, as shown in FIG. 5. FIG. 5 shows a graphical representation 500 comprising a pager output 505, an on/off control signal 510 (shown in FIG. 4 as on/off control signal 445) of the wireless receiver 400, a demodulator output 520, a correlator output 530, and a received signal strength indicator output 540, all as a function of time, according to an example embodiment. As shown in FIG. 5, the pager output 505 illustrates receipt of a full ID packet 507. The on/off signal 510 of the wireless receiver 400 may include an off mode 512 and an on mode 514. The on/off signal 510 may not be drawn to scale in FIG. 5: For example, in an example embodiment, the off mode 512 may be significantly longer than the on mode 514. As noted above, the on/off signal 510 (e.g., control signal 445) may control an operating mode of a portion of the receiver, such as the analog processing circuit (or at least a portion of the analog processing circuit, for example) and a digital processing circuit of the receiver 400, for example, such as placing the analog and/or digital processing circuit in a low power state during off cycles (such as off cycle 512 and these time durations may be different for the analog and digital processing circuits), and placing the analog processing circuit in an operating or high power mode during on cycles (such as on cycle 514). When placed in a lower power state, the analog processing circuit does not process the received signals, and therefore, may save power.

The demodulator output 520 may output a demodulated portion of the ID packet 507 when the on/off signal 510 is in an on cycle (e.g., 514), and may be zeroes during the times when the on/off signal 510 is in off mode (e.g., 512.) If no signal is being demodulated by demodulator output may include noise 524. Thus, outputting zeroes at modulator output 520 may prevent noise from generating erroneous correlations, for example, although this is not required. When an ID packet 507 is received at receiver 400, the analog processing circuit may initially be in a low power or off state as shown by the low or zero on the on/off signal 510 at the beginning of the received ID packet 507. On/off signal 510 may then go high, to an on cycle (e.g., from off cycle 512 to on cycle 514), thereby causing the analog processing circuit to wake from a lower power state to an operational or high power state and perform analog processing on a portion 528 of the received ID packet. The analog processed portion of the ID packet may then be input to the demodulator for demodulation. The demodulator output 520 may include the demodulated portion of the ID packet 528. This portion of the demodulated ID packet may be input to the correlator. The correlator may correlate the portion of the demodulated ID packet (or other output signal) with an address or ID, for example, and generate a correlation result.

The correlator output 530 may reach a peak 532 upon the wireless receiver's 400 receipt and correlation of the portion of the ID packet 528. The peak 532, e.g., if greater than a correlation threshold, may indicate that the sequence in the portion of the ID packet 528 matches a pattern in the detector circuit 480, e.g., a correlation. The detector circuit 480 may compare the peak 532 to the correlation threshold and may register a time which is about a peak of the correlation result 550 and a time which is after the about the peak of the correlation result 555.

The received signal strength indicator output 540 communicates the signal strength of the analog processed portion of the ID packet 507, which is used to measure a first received signal strength 542 at the about the peak 532 of the correlation result 550, and a second received signal strength 544 at the after the about the peak of the correlation result 555.

In some embodiments, the detector circuit 480 may determine that the portion of the ID packet 528 resulted from a valid page at least in part when the first received signal strength 542 exceeds a first signal strength threshold. Typically, random noise that may have matched a pattern in the detector circuit 480 will not create a strong enough signal to exceed the first signal strength threshold. Therefore, comparing the first received signal strength 542 to the first signal strength threshold may serve to exclude most false alarms caused by noise matching the pattern in the detector circuit 480.

The detector circuit 480 may also compare, after the correlation peak 532, 550, the second received signal strength 544 to a second received signal strength threshold. Typically, the signal strength of a page will fall off some period of time after it causes the correlator output 530 to form a peak 532. Thus, as shown in FIG. 5, the received signal strength output 540 will fall or decrease after about the peak (e.g., 532) of the correlation result 550. For example, if the signal strength of the received signal does not decrease substantially after about the peak of the correlation result, this may indicate a false hit or a false correlation, for example. The time after about the peak (e.g., 532) of the correlation result 555 may be chosen such that the page will have caused the received signal strength output 540 to fall off below a second received signal strength threshold. The detector circuit 480 may be configured to determine that the portion of the ID packet 528 was the result of a valid page based in further part either on the second received signal strength 544 being less than a second received signal strength threshold, or on the second received signal strength 544 being some amount less than the first received signal strength 542, for example.

Figure 6:
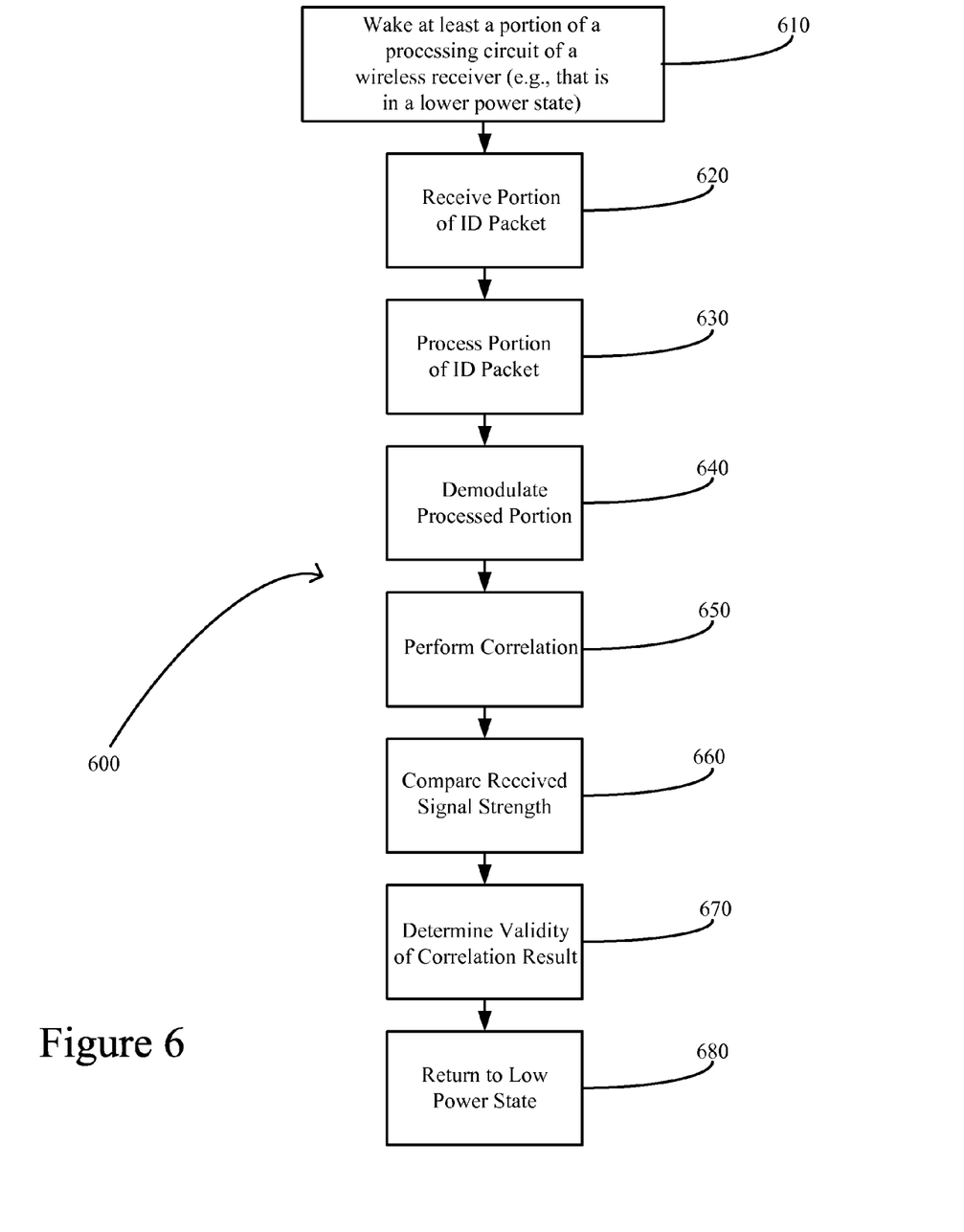
FIG. 6 is a flowchart illustrating operation of a wireless receiver according to an example embodiment.

FIG. 6 is a flow chart illustrating operation of a receiver according to an example embodiment. As shown in block 610, at least a portion of a device, or at least a portion of a wireless receiver circuit, such as at least a portion of an analog processing circuit 320 and/or signal processing circuit 450 (and/or other circuit of a wireless receiver) may wake from a low power state to an operational state. In some embodiments, waking from the low power state to the operational state may include periodically waking at least the portion of the receiver circuit from the low power state to the operational state, and then returning the at least the portion of the analog processing circuit to the low power state. In further embodiments, the at least the portion of a wireless receiver circuit (e.g., at least a portion of the analog processing circuitry and/or signal processing circuit of the receiver) may be periodically woken to an operational state for a period of time that is less than a receipt time for a full ID packet, such as less than sixty-eight microseconds (as an illustrative example), and then returned to the low power state if there was no valid page, for example.

As shown in block 620, a portion of an ID packet that is less than a full ID packet may be received while in the operational state. As shown in block 630, the portion of the ID packet may be processed to form a processed portion of the ID packet after the portion of the ID packet is received. In some embodiments, the processing the portion of the ID packet may include, for example, analog processing and/or other processing. As shown in block 640, the processed portion of the ID packet may then be demodulated. In some embodiments, the processing the portion of the ID packet shown in block 630 comprises performing analog processing on the portion of the ID packet to generate an analog processed portion of the ID packet, and demodulating the analog processed portion of the ID packet to generate a demodulated portion of the ID packet. In other embodiments, no demodulation is performed.

As shown in block 650, the processed portion of the ID packet is then correlated to generate a correlation result. The processed portion of the ID packet that is correlated may comprise the analog processed portion of the ID packet or the demodulated portion of the ID packet. The correlation result may then be compared to a correlation threshold to determine whether there was a valid page. As shown in block 680, the analog processing circuit (or portion thereof) is then returned to the low power state.

Some embodiments further comprise blocks 660 and 670. As shown in block 660, a received signal strength of the received signal may be compared to a threshold. In some embodiments, a first received signal strength of the portion of the ID packet may be compared to a first signal strength threshold at about a peak of the correlation result. In further embodiments, a second received signal strength of the portion of the ID packet may be compared to a second signal strength threshold after about the peak of the correlation threshold. As shown in block 670, the validity of the correlation result may be determined in part on either or both the comparison of the first received signal strength of the portion of the ID packet to the first signal strength threshold and the comparison of the second received signal strength to the second received signal strength threshold.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving, by a receiver unit, only a portion of an ID packet that is less than a full ID packet;
   processing the portion of the ID packet;
   correlating the processed portion of the ID packet with an address of the receiver unit to generate a correlation result; and
   comparing the correlation result to a correlation threshold.

2. The method of claim 1 wherein the processing the portion of the ID packet comprises:
   performing analog processing on the portion of the ID packet to generate an analog processed portion of the ID packet; and
   demodulating the analog processed portion of the ID packet to generate a demodulated portion of the ID packet;

wherein the correlating the portion of the ID packet comprises correlating the demodulated portion of the ID packet with the address of the receiver unit.

3. The method of claim 1 further comprising:
comparing, at about a peak of the correlation result, a first received signal strength of the portion of the ID packet to a first signal strength threshold; and
determining that the correlation result is valid based at least in part on the comparing the first received signal strength to the first signal strength threshold.

4. The method of claim 3 further comprising:
comparing, after the about the peak of the correlation result, a second received signal strength of the portion of the ID packet to a second signal strength threshold;
wherein the determining that the correlation result is valid is further based at least in part on comparing the second received signal strength to the second signal strength threshold.

5. The method of claim 1 wherein the receiving comprises receiving only a portion of a Bluetooth ID packet that is less than a full Bluetooth ID packet.

6. An apparatus comprising:
a wireless receiver, the wireless receiver including:
an analog processing circuit configured to receive and process only a portion of an ID packet during an operational state, the portion of the ID packet being less than a full ID packet; and
a digital processing circuit including:
a correlator coupled to the analog processing circuit, the correlator being configured to correlate a processed portion of the ID packet with an address of the wireless receiver and to output a correlation result; and
a detector circuit configured to compare the correlation result to a correlation threshold.

7. The apparatus of claim 6 wherein the analog processing circuit comprises one or more of:
a low noise amplifier;
a mixer;
an automatic gain control;
a filter; or
an analog-to-digital converter.

8. The apparatus of claim 6 wherein at least a portion of the analog processing circuit and/or digital processing circuit is configured to periodically wake from a low power state to the operational state and return to the low power state.

9. The apparatus of claim 6 wherein at least a portion of the analog processing circuit and/or digital processing circuit is configured to periodically wake from a low power state to the operational state for less than sixty-eight microseconds before returning to the low power state.

10. The apparatus of claim 6 wherein the wireless receiver further includes a Bluetooth wireless interface configured to receive the portion of the ID packet and transmit the portion of the ID packet to the analog processing circuit and/or digital processing circuit.

11. The apparatus of claim 6 wherein the digital processing circuit comprises:
a demodulator configured to demodulate the processed portion of the ID packet to generate a demodulated portion of an ID packet, and transmit the demodulated portion of the ID packet to the correlator; and
wherein the processed portion of the ID packet comprises the demodulated portion of the ID packet.

12. The apparatus of claim 11 wherein:
the demodulator is further configured to turn at least partially off when the analog processing circuit and/or digital processing circuit is in the low power state.

13. The apparatus of claim 6 wherein the wireless receiver further includes:
a received signal strength indicator;
wherein the received signal strength indicator is configured to measure a first signal strength of the portion of the ID packet at about a peak of the correlation result; and
wherein the detector circuit is configured to determine that the portion of the ID packet was valid based at least in part on the first signal strength exceeding a signal strength threshold.

14. The apparatus of claim 6 further comprising:
a received signal strength indicator;
wherein the received signal strength indicator is configured to measure a first signal strength of the portion of the ID packet at about a peak of the correlation result;
wherein the received signal strength indicator is further configured to measure a second signal strength of the portion of the ID packet after the about the peak of the correlation result; and
the detector circuit is configured to determine that the portion of the ID packet was valid based at least in part on the first signal strength exceeding a first signal strength threshold and the second signal strength being less than a second signal strength threshold.

15. The apparatus of claim 6 wherein the portion of the ID packet comprises a portion of a Bluetooth ID packet.

16. The apparatus of claim 6 wherein the analog processing circuit is configured to return to the operational state to receive and process a full ID packet in response to the comparison of the correlation result to the correlation threshold.

17. A processing circuit adapted for operation in a wireless receiver, the processing circuit configured to:
receive only a portion of an ID packet that is less than a full ID packet;
process the portion of the ID packet;
correlate the processed portion of the ID packet with an address of the wireless receiver to generate a correlation result; and
compare the correlation result to a correlation threshold.

18. The processing circuit of claim 17, wherein the processing circuit includes:
an analog processing circuit configured to:
receive the only the portion of the ID packet that is less than the full ID packet; and
process the portion of the ID packet;
a correlator configured to correlate the processed portion of the ID packet with the address of the wireless receiver to generate the correlation result; and
a detector circuit configured to compare the correlation result to the correlation threshold.

19. The processing circuit of claim 17 wherein the detector circuit is further configured to:
compare, at about a peak of the correlation result, a first received signal strength of the portion of the ID packet to a first signal strength threshold; and
determine that the correlation result is valid based at least in part on the comparing the first received signal strength to the first signal strength threshold.

20. The method of claim 17 wherein the detector circuit is further configured to:
compare, at about a peak of the correlation result, a first received signal strength of the portion of the ID packet to a first signal strength threshold;

compare, after the about the peak of the correlation result, a second received signal strength of the portion of the ID packet to a second signal strength threshold; and determine that the correlation result is valid based at least in part on the comparing the first received signal strength to the first signal strength threshold and the comparing the second received signal strength to the second signal strength threshold.

* * * * *